United States Patent [19]

Habara

[11] Patent Number: 4,858,151

[45] Date of Patent: Aug. 15, 1989

[54] DATA PROCESSING DEVICE FOR USE IN SCINTILLATION CAMERA APPARATUS

[75] Inventor: Atsushi Habara, Ootawara, Japan

[73] Assignee: Kabushiki Kaisha Toshiba, Kawasaki, Japan

[21] Appl. No.: 98,194

[22] Filed: Sep. 17, 1987

[30] Foreign Application Priority Data

Sep. 29, 1986 [JP] Japan .................................. 61-228236

[51] Int. Cl.$^4$ .............................................. G06F 15/42
[52] U.S. Cl. .............................. 364/527; 250/363.07; 364/413.24; 378/162; 358/169
[58] Field of Search ............... 364/524, 525, 527, 571, 364/414, 413.24, 413.13; 250/363 SE, 363 SR, 369; 358/111, 164, 168, 169; 378/162, 164

[56] References Cited

U.S. PATENT DOCUMENTS

| | | | |
|---|---|---|---|
| 4,179,607 | 12/1979 | Lange et al. | 364/414 |
| 4,429,226 | 1/1984 | Inbar | 250/363 SE |
| 4,533,947 | 8/1985 | Smith | 364/414 |
| 4,566,074 | 1/1986 | Nishikawa | 250/369 |
| 4,588,897 | 5/1986 | Inbar et al. | 250/363 SE |
| 4,604,697 | 8/1986 | Luthra et al. | 364/414 |
| 4,652,760 | 3/1987 | Kondo et al. | 364/414 |
| 4,661,909 | 4/1987 | Kumazawa et al. | 364/414 |
| 4,752,691 | 6/1988 | Hawman | 250/363 SR |

OTHER PUBLICATIONS

Sarper, "Nuclear Medicine Instrumentation," Thomas Books, Springfield, Illinois, pp. 114–132, 1985.

Primary Examiner—Parshotam S. Lall
Assistant Examiner—Kevin J. Teska
Attorney, Agent, or Firm—Finnegan, Henderson, Farabow, Garrett, & Dunner

[57] ABSTRACT

A scintillation camera apparatus adapted for displaying an image representing a radioisotope distribution within a subject under examination at a substantially constant level in image density during a persistent data acquisition procedure comprises an auxiliary memory for sequentially storing position signals representing detected positions of gamma rays, and an image memory for storing a count representing the frequency of detection of gamma rays in a memory location accessed by position signals. The auxiliary memory has a predetermined capacity, and thus, when the number of the sequentially stored position signals exceeds this memory capacity, the earliest-entered position signals stored therein are made to overflow therefrom. A memory controller accesses a location in the image memory by means of the overflowed position signals and decrements the content at the accessed location. After position signals are made to overflow from the auxiliary memory, the quantity of data stored in the image memory (the total number of counts of gamma rays) remains always at a constant value equal to the capacity of the auxiliary memory.

11 Claims, 6 Drawing Sheets

DATA PROCESSING DEVICE FOR USE IN SCINTILLATION CAMERA APPARATUS

BACKGROUND OF THE INVENTION

The present invention relates to a data processing device for use in a scintillation camera apparatus.

When a scintillation camera is used to acquire medical diagnostic data (hereinafter referred to simply as data) relating to a living subject under examination, a so-called persistent data acquisition procedure is executed in advance, for placing the subject in the optimum position for acquiring diagnostic data. The data acquired for this purpose is stored sequentially in an acquisition memory and is then displayed on a display device (monitor) as a distribution image of RI (radioisotopes) within the body of the subject. The data stored in the acquisition memory includes information about detected positions and frequencies of events of gamma rays irradiated from RI within the subject's body.

The quantity (the count number) of such data acquired and stored in the acquisition memory increases with time, so that while the density of the RI distribution image on the monitor is low at the early stages of the persistent data acquisition procedure, it is much greater at the later stages thereof. Due to this variation in image density, an image showing crealy the RI distribution cannot easily be obtained. In order to attain a clear image, it is necessary to make frequent manual adjustments using the density level controller of the display device.

SUMMARY OF THE INVENTION

It is an object of this invention to provide a data processing device for use in a scintillation camera apparatus, which provides a RI distribution image with a substantially constant density level, without requiring manual adjustment of the density level.

The data processing device of this invention comprises an image memory, which is accessed by position signals representing a detected position of gamma rays, and stores, in an accessed location, a count value representing the frequencies of detection of gamma rays at the position specified by the position signals; and memory control means, which accesses the image memory by use of the position signals and increments data in the accessed location.

According to this invention, an auxiliary memory is coupled to the memory control means, which sequentially stores position signals representing detected positions of gamma rays, and causes the earliest-entered position signals stored therein to overflow therefrom when the number of the sequentially stored position signals exceeds the capacity of the auxiliary memory. The memory control means accesses the image memory by use of the overflowed position signals from the auxiliary memory and decrements data at the accessed location of the image memory.

DETAILED DESCRIPTION OF THE PREFERRED EMBODIMENTS

Figure 1:
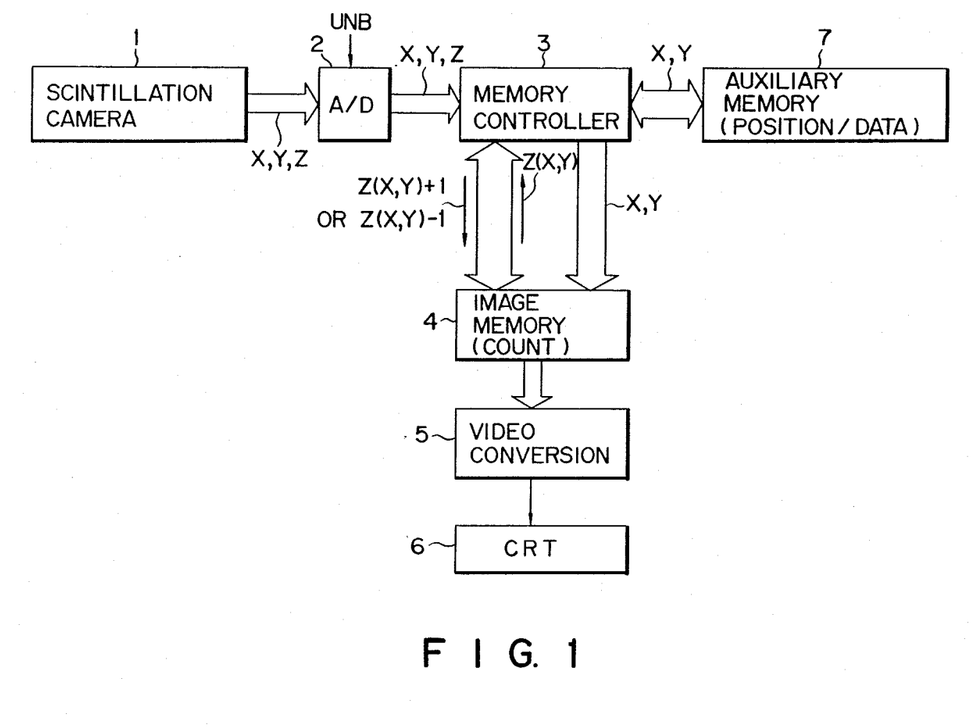
FIG. 1 is a block diagram of a scintillation camera apparatus including a data processing device according to this invention.

FIG. 1 is a schematic block diagram of a scintillation camera apparatus including a data processing device of this invention. A scintillation camera 1 of a known type, which detects gamma rays radiated from inside the body (not shown) of a subject under examination, outputs position signals X and Y representing the detected positions of gamma rays, and an energy signal Z representing the energy thereof. The output signals X, Y, and Z of scintillation camera 1 are supplied to an analog-to-digital (A/D) converter 2, which is enabled by an unblanking signal (UNB) obtained by analyzing the pulse height of energy signal Z from scintillation camera 1, so as to convert signals X, Y, and Z into digital signals each of 8 bits, for example.

The digital signals X, Y, and Z are then supplied to a memory controller 3 which includes a microprocessor. Memory controller 3 analyzes the pulse height of energy signal Z, to determine whether or not an event of gamma rays, from which signals X, Y, and Z originated, is to be acquired. If it is decided that the event is to be acquired, memory controller 3 presents position signals X and Y as address data to an image memory 4, receives count data Z(X,Y), which indicates the number of times the gamma rays are detected, from the location accessed by the address data X and Y, and returns Z(X,Y)+1 to the same location. In other words, every time an event of gamma rays to be acquired occurs, the data at the memory location of image memory 4 specified by address data X and Y, is incremented by one. In this manner, the count data indicating the number of events of gamma rays is stored in image memory 4 for each detected position, and the count data read out from image memory 4 is converted into a video signal by a video converter 5. This video signal is applied to a CRT monitor 6, to image the distribution of radioisotopes within the body of the subject. The arrangement so far described is the same as that of a known scintillation camera apparatus.

According to this invention, memory controller 3 has coupled thereto an auxiliary memory 7 which is used during the persistent data acquisition procedure. This auxiliary memory 7 has a given capacity for each of position signals X and Y, and is designed such that when an event of gamma rays to be acquired occurs, it stores position signals X and Y of the detected gamma rays. In addition, auxiliary memory 7 is sequentially supplied with position signals X and Y, and when the quantity (number) of the stored position signals exceeds the capacity of the auxiliary memory, the first-input position signals (X, Y) overflow to memory controller 3. Memory controller 3 accesses image memory 4 by means of the overflowed position signals and decrements by one the data at that location. More specifically, memory controller 3 receives count data Z(X,Y) from the image memory location specified by the overflowed position signals, and returns Z(X,Y)+1 to the same location.

Figure 2:
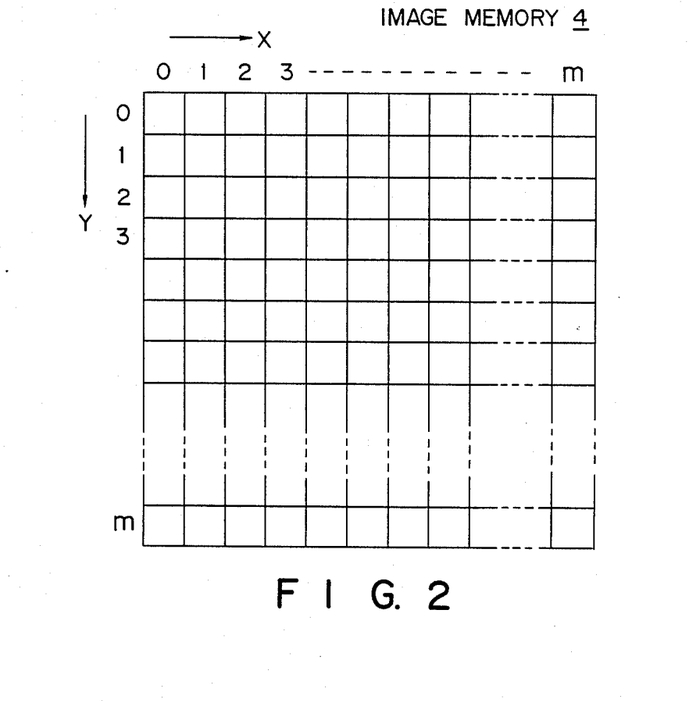
FIG. 2 shows an arrangement of the image memory shown in FIG. 1.

Image memory 4, which is constituted by a known two-dimensional memory, as shown in FIG. 2, has addresses from o to m in X and Y directions. When the image memory has a size of 512×512 pixels, m=511, and when it has a size of 256×256 pixels, m=255. One pixel may have a depth of 8 bits.

Figure 3:
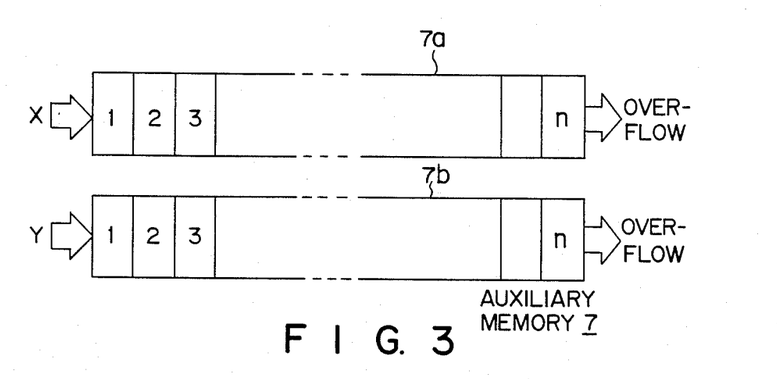
FIG. 3 shows an arrangement of a first-in, first-out type auxiliary memory used in an embodiment of this invention.

Auxiliary memory 7 has one-dimensional shift register type memories 7a and 7b which respectively store signals X and Y, as shown in FIG. 3. Auxiliary memories 7a and 7b each have n stages and store a one-byte position signal at each stage. The capacity of auxiliary memories 7a and 7b, namely the maximum number n of position signals which can be stored, is less than the capacity of image memory 4, or the number of memory locations (m×m) x counts per pixel (255 in case of 8 bits), and is set to, for example, n=1000 or 4000. Auxiliary memories 7a and 7b, which may be of a so-called first-in, first-out (FIFO) type, sequentially store position signals X and Y supplied from memory controller 3. When (n+1)-th signals X and Y, which exceed the capacity n of the auxiliary memories are loaded into auxiliary memories 7a and 7b, the earliest-entered position signals overflow. As was mentioned earlier, the overflowed position signals are returned to memory controller 3, which in turn decrements data in that location in image memory 4 which is specified by the overflowed position signals.

The feature of the data processing device of this invention lies in that the quantity of data (the total count number) stored in image memory 4 is set constant after position signals overflow from auxiliary memory 7. The constant data quantity is equal to the number of stages n of the auxiliary memory. Due to the constant data quantity, a variation in the density level of an RI distribution image, which is proportional to the count number of the gamma rays stored for each pixel, is suppressed, thereby eliminating the need for density adjustment by means of a density level controller.

The operation of this embodiment will now be explained in detail.

For convenience of explanation, image memory 4 has nine locations, as is shown in FIGS. 5A to 5E, while auxiliary memories 7a and 7b of a FIFO type shift register memory have six stages, as is shown in FIGS. 4A to 4E.

Figure 4A:
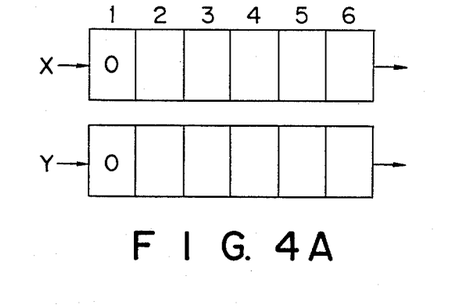
FIG. 4A to 4E are diagrams for explaining the operation of the auxiliary memory.
Figure 4B:
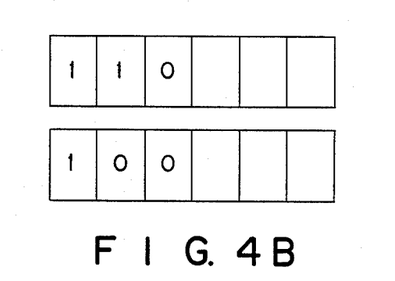
Figure 4C:
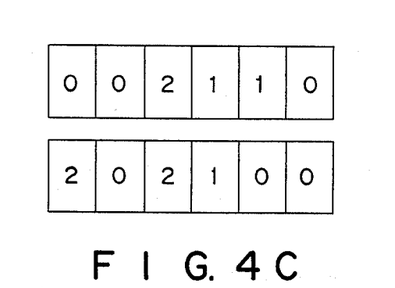
Figure 5A:
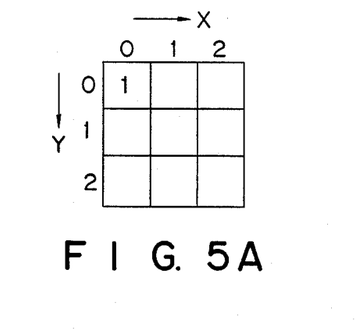
FIGS. 5A to 5E are diagrams, corresponding to FIGS. 4A to 4E, for explaining the operation of the image memory.
Figure 5B:
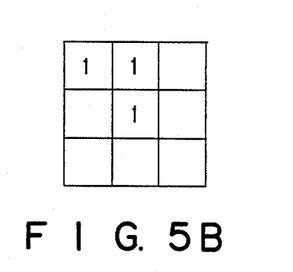
Figure 5C:
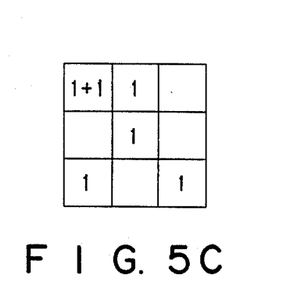

First, when position signals, X=0 and Y=0, are input to auxiliary memory 7, as shown in FIG. 4A, the data in that location in image memory 4 accessed by the position signals is incremented by one. Then, the subsequent position signals, X=1 and Y=0, are input to the auxiliary memory, so that the previously-input position signals (X=0, Y=0) are shifted one stage. Consequently, as is shown in FIG. 5B, the location in image memory 4 accessed by the second position signals (X=1, Y=0) is incremented by one. When position signals X=1 and Y=1 are input to auxiliary memory 7, the data in that location in image memory 4 accessed by the position signals are incremented by one (see FIG. 5B). When position signals, X=2 and Y=2, X=0 and Y=0, and X=0 and Y=2, are sequentially input to auxiliary memory 7, as shown in FIG. 4C, the auxiliary memory becomes full. The data in those locations in image memory 4 accessed by these position signals are incremented as shown in FIG. 5C. It should be noted that once the auxiliary memory becomes full, the total of the counts stored in the image memory thereafter becomes six, which is equal to the capacity of the auxiliary memory.

Figure 4D:
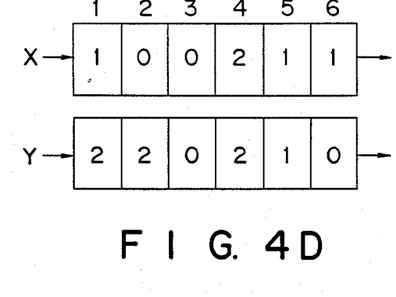
Figure 5D:
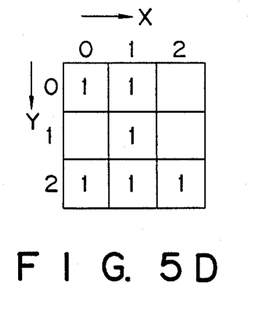

When next position signals, X=1 and Y=2, are input to auxiliary memory 7, as shown in FIG. 4D, the first-input position signals, X=0 and Y=0, overflow from the auxiliary memory. As a result, the data in that location in the image memory accessed by way of the overflowed position signals is decremented from two (FIG. 5C) to one, as is shown in FIG. 5D. Since the data in the image memory location accessed by position signals X=1 and Y=2 is incremented by one, the total number of counts in the image memory is also kept at six, in this case.

Figure 4E:
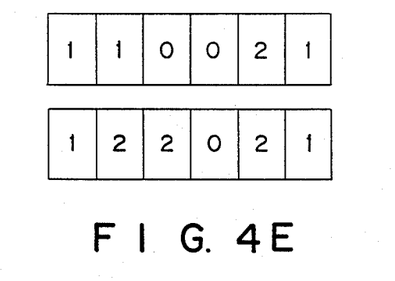

When the next position signals X=1 and Y=1 are input to the auxiliary memory, as shown in FIG. 4E, the earliest-entered position signals X=1 and Y=0 overflow. Consequently, the data in the image memory location accessed by the newly-input position signals is incremented by one, while the data in the memory location accessed by the overflowed position signals is decremented by one. In this case, the total number of counts in the image memory is also kept at six.

Figure 5E:
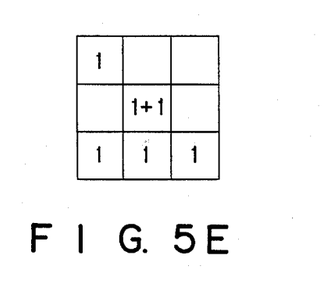
Figure 6:
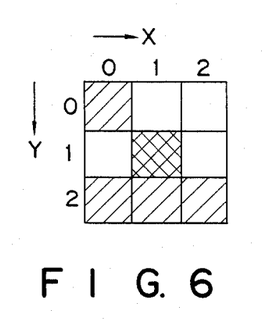
FIG. 6 is a diagram for explaining a distribution image of radioisotopes inside the body of the subject under examination which is displayed by use of the content of the image memory shown in FIG. 5E.

The RI distribution image corresponding to the contents of the image memory shown in FIG. 5E is displayed at the image density as shown in FIG. 6. The pixel of X=1 and Y=1 having a count of two is displayed at a level of density greater than other pixels having a count of one. Since the total number of counts stored in the image memory is kept at six, the average density level of the RI distribution image on the display is substantially constant.

Another embodiment of this invention will now be explained, with reference to FIGS. 7 and 8. In this embodiment, an ordinary memory adapted for performing a data read/write operation by way of address designation is used as auxiliary memory 7, in place of the first-in, first-out type memory.

Figure 7:
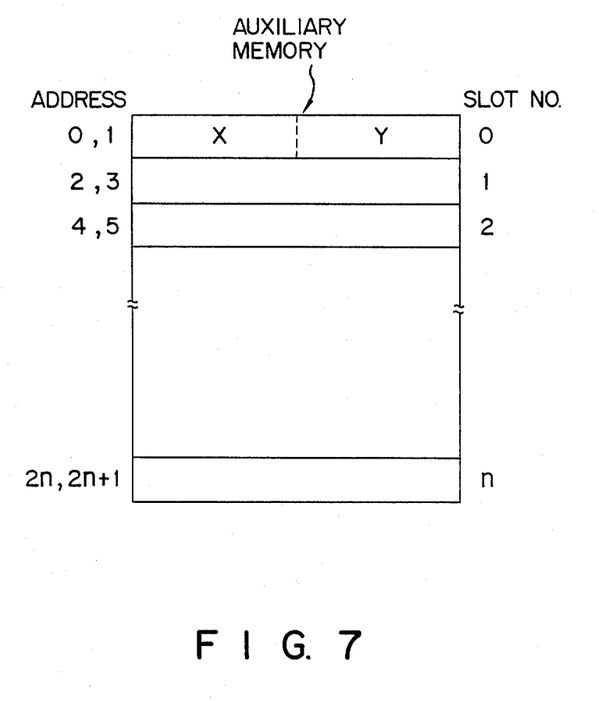
FIG. 7 shows an arrangement of an auxiliary memory, which is used in another embodiment of this invention, and is adapted for performing a data read/write operation by way of address designation.

FIG. 7 illustrates an arrangement of the auxiliary memory used in this embodiment, which has n slots (memory locations) for storing position signals X and Y each of 8 bits. The individual slots are assigned numbers o to n, respectively, and each have two memory locations corresponding to position signals X and Y, respectively. These memory locations are assigned addresses 0 to 2n, respectively. The data read/write to auxiliary memory 7 and updating of data in image memory 4 are carried out based on a program stored in memory controller 3 (which includes a microprocessor).

Referring now to the flowchart of FIG. 8, the memory control operation will be explained below in detail. In the flowchart, $S_1$ to $S_4$ represent the following:

$S_1$: the number of slots, n, of the auxiliary memory.

$S_2$: the number of slots of the auxiliary memory presently in use (the number of slots in which data is stored).

$S_3$: the number (No.) of the slot of the auxiliary memory in which is stored the earliest-entered data.

$S_4$: the number (No.) of the slot into which the next data is to be stored.

$S_2$ to $S_4$ each have an initial value of o.

Figure 8:
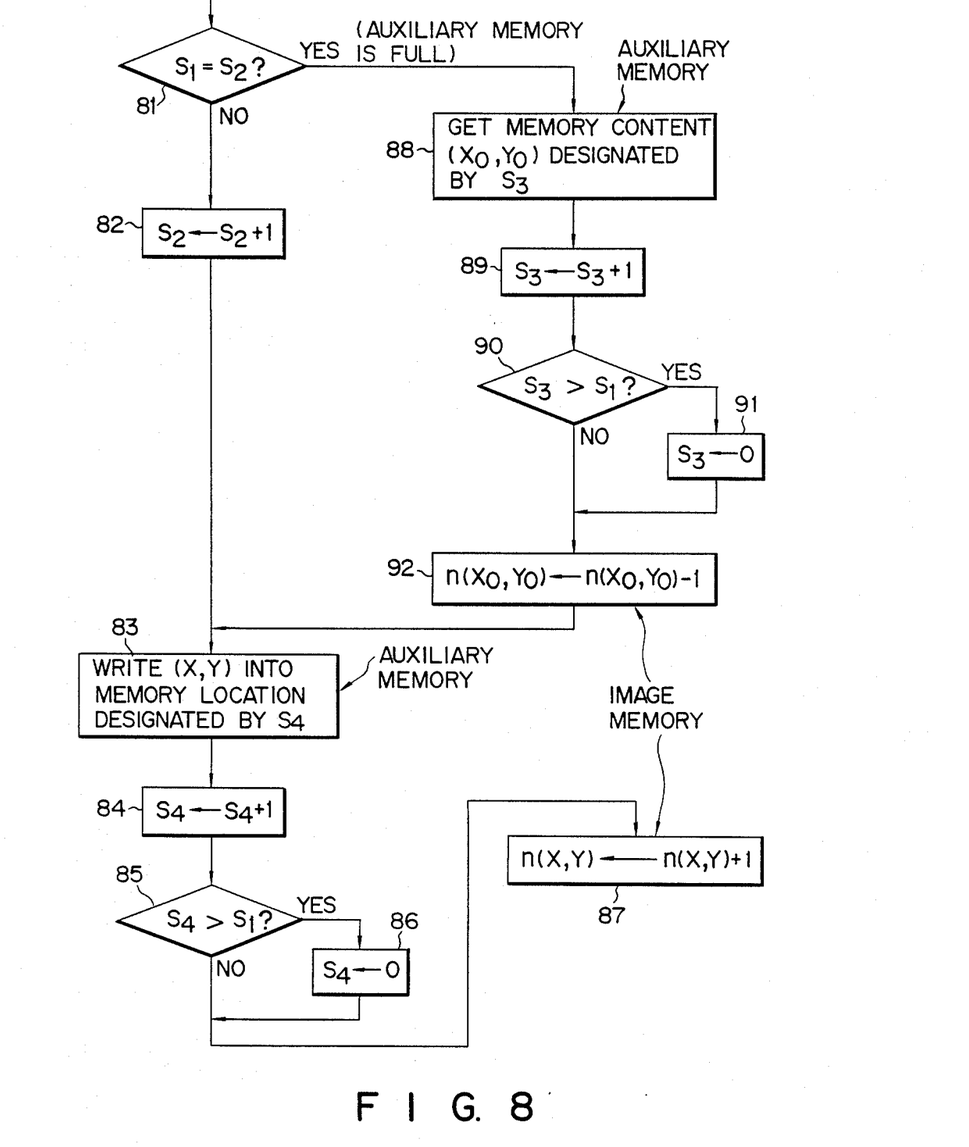
FIG. 8 is a flowchart for explaining the operation of a memory controller when the memory of FIG. 7 is used.

Referring to FIG. 8, each time memory controller 3 receives a pair of position signals X and Y, it compares the values $S_1$ and $S_2$, in step 81. This comparison is performed so as to determine whether or not the auxiliary memory is full. When $S_1$ is not equal to $S_2$, $S_2$ is incremented by one, in step 82. In the subsequent step 83, the input position signals are written into the auxiliary memory slot designated by $S_4$. As the initial value of $S_4$ is 0, the first input position signals $X_0$ and $Y_0$ are stored in the No. 0 slot. In step 84, $S_4$ is incremented by one, which advances by one the number of the slot for storing the next position signals. In the subsequent step 85, $S_4$ is compared with $S_1$. If $S_4 \leq S_1$, the flow advances to step 87, where the data at the image memory location specified by the position signals X and Y is incremented by one. On the other hand, if $S_4 > S_1$ in step 85, that is, if the number of the slot for storing the next position signals is greater than the total number of slots in the auxiliary memory, $S_4$ is reset to 0 in step 86. The operation from step 81 to step 87 is the same as the operation shown in FIGS. 4A to 4C.

If $S_1 = S_2$ in step 81, that is, if all the slots of the auxiliary memory are filled with data, the contents of the auxiliary memory slot specified by $S_3$, namely, the earliest-entered position signals are read out in step 88. When the decision of $S_1 = S_2$ is first made, $S_3 = 0$, so that the position signals in the No. 0 slot are read out and are returned to memory controller 3. This corresponds to the overflow of position signals from the auxiliary memory in the first embodiment. In the next step 89, $S_3$ is incremented by one, which means that, when the second decision of $S_1 = S_2$ is made, position signals are taken out from the No. 1 slot of the auxiliary memory.

Then, $S_3$ is compared with $S_1$ in step 90, to determine whether or not the number of times the position signals overflow from the auxiliary memory exceeds the total number n of slots in the auxiliary memory. If $S_3 > S_1$, $S_3$ is reset to 0 in step 91. Consequently, the number of the slot from which the next position signals are to be taken out is reset to 0.

When the position signals overflow from the auxiliary memory, in step 92 the memory controller decrements by one, the data in the image memory location specified by the overflowed position signals.

Once $S_1$ is determined as equaling $S_2$ ($S_1 = S_2$), in step 81, that is, once the auxiliary memory has filled with position signals, steps 88 to 92 and steps 83 to 87 are executed repeatedly. As a result, the quantity of data in the image memory or the number of counts is maintained at a constant value equal to the number n of slots of the auxiliary memory.

What is claimed is:

1. An image processing system for displaying image data corresponding to gamma rays irradiated from radioisotopes injected into a subject under examination and detected by a scintillation camera, the image data being displayed on a display device as a distribution image of the radioisotopes within the subject, the system comprising:

an image memory for storing data representing the number of times gamma rays are detected at positions specified by position signals output from the scintillation camera;

memory control means, coupled to the image memory, for accessing the image memory in response to position signals output from the scintillation camera to increment the data stored at locations in the image memory corresponding to the position signals; and an auxiliary memory, coupled to the memory control means, for sequentially storing position signals output from the scintillation camera, the auxiliary memory having a predetermined storage capacity, the auxiliary memory outputting the earliest-entered position signal at times when the number of position signals sequentially stored exceeds the storage capacity of the auxiliary memory; and wherein the memory control means accesses the location in the image memory corresponding to the earliest-entered position signal output from the auxiliary memory to decrement the data stored at that location.

2. The system according to claim 1, wherein the image memory has a storage capacity greater than that of the auxiliary memory.

3. The system according to claim 1, wherein the memory control means includes a memory controller for supplying the position signals output from the scintillation camera as addresses to the image memory.

4. The system according to claim 1, wherein the image memory is a two-dimensional memory, and the auxiliary memory includes a plurality of one-dimensional shift register type memories.

5. The system according to claim 1, wherein the auxiliary memory includes a plurality of first-in first-out memories.

6. The system according to claim 1, wherein the auxiliary memory includes a memory having a plurality of memory slots, each memory slot having two memory locations corresponding to a pair of position signals, respectively.

7. An image processing system for displaying image data corresponding to gamma rays irradiated from radioisotopes injected into a subject under examination and detected by a scintillation camera, the image data being displayed on a display device as a distribution image of the radioisotopes within the subject, the system comprising:

an image memory for storing data representing the number of times gamma rays are detected at positions specified by position signals output from the scintillation camera;

memory control means, coupled to the image memory, for accessing the image memory in response to position signals output from the scintillation camera to increment the data stored at locations in the image memory corresponding to the position signals; and an auxiliary memory, coupled to the memory control means, for sequentially storing position signals output from the scintillation camera, the auxiliary memory having a predetermined storage capacity, the auxiliary memory outputting the earliest-entered position signal at times when the number of position signals sequentially stored exceeds the storage capacity of the auxiliary memory; and wherein the memory control means accesses the location in the image memory corresponding to the earliest-entered position signal output from the auxiliary memory to decrement the data stored at that location, and the image memory has a storage capacity greater than that of the auxiliary memory.

8. The system according to claim 7, wherein the memory control means includes a memory controller for supplying the position signals output from the scintillation camera as addresses to the image memory.

9. The system according to claim 7, wherein the image memory is a two-dimensional memory, and the auxiliary memory includes a plurality of one-dimensional shift register type memories.

10. The system according to claim 7, wherein the auxiliary memory includes a plurality of first-in first-out memories.

11. The system according to claim 7, wherein the auxiliary memory includes a memory having a plurality of memory slots, each memory slot having two memory locations corresponding to a pair of position signals, respectively.

* * * * *